(No Model.)
C. H. ALLEN & H. C. MALTBY.
HALTER
No. 562,752. Patented June 23, 1896.
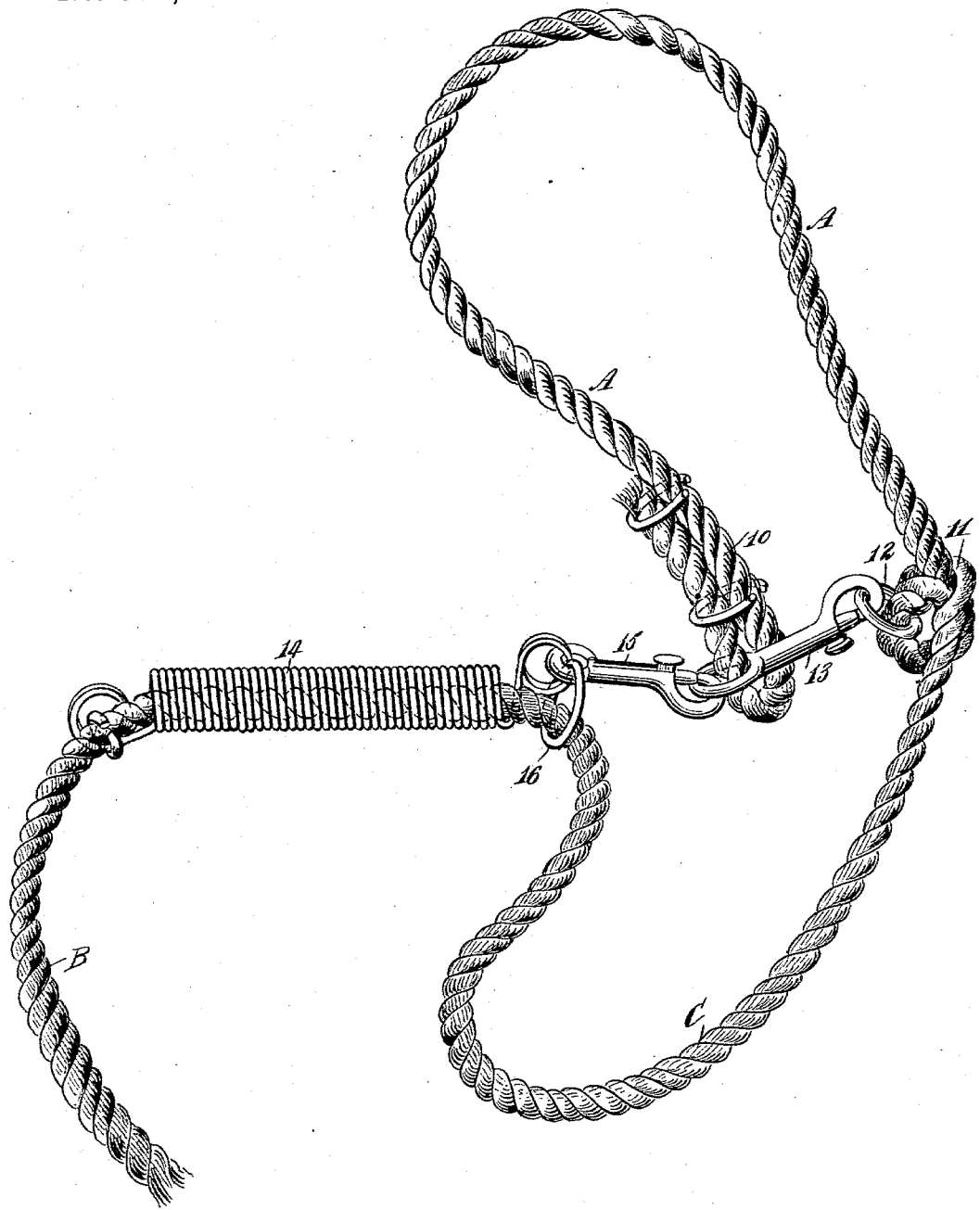
WITNESSES:
INVENTORS
C. H. Allen.
H. C. Maltby.
BY Munn & Co.
ATTORNEYS.

UNITED STATES PATENT OFFICE.

CHARLES H. ALLEN AND HARRY C. MALTBY, OF CHICAGO, ILLINOIS.

HALTER.

SPECIFICATION forming part of Letters Patent No. 562,752, dated June 23, 1896.

Application filed July 27, 1895. Serial No. 557,295. (No model.)

*To all whom it may concern:*

Be it known that we, CHARLES H. ALLEN and HARRY C. MALTBY, of Chicago, in the county of Cook and State of Illinois, have invented a new and useful Improvement in Halters, of which the following is a full, clear, and exact description.

Our invention relates to an improvement in halters, having for its object to construct a halter from a single piece of material, and furthermore to provide for a running-noose loop and a hitching or leading strap spring-controlled, the spring being attached to the said strap at one of its ends and to the throat-latch or equivalent portion of the halter, and furthermore to provide a hitching or leading strap having a spring attached at one of its ends to the strap, the strap passing through the spring, and the spring at its opposite end being adapted for attachment to the bridle or bit, whereby the halter-strap or hitching or leading strap will not be broken when suddenly pulled upon, since when the spring has been pulled to its full length and strength the force will be exerted equally upon the entire length of the strap, thus preserving the spring from injury. In fact, when the spring has been pulled out and receives all the strain it will bear the horse will then be pulling directly on the whole length of the strap and spring combined.

The invention consists in the novel construction and combination of the several parts, as will be hereinafter fully set forth, and pointed out in the claims.

Reference is to be had to the accompanying drawing, forming a part of this specification, which represents a perspective view of the improved halter.

In carrying out the invention the halter is made from a single piece of material, preferably rope, and this rope is provided at one of its ends with a loop 10, and a second loop 11 is made in the rope a predetermined distance from the end loop. The intermediate loop 11 carries a ring 12, and the said ring is engaged by a snap 13, loosely mounted in the end loop 10. Under this construction the neck-loop A of the halter is formed.

The hitching or leading strap B, also sometimes called the "halter-strap," is a continuation of the rope from the intermediate loop 11; and at a predetermined point on the hitching-strap one end of a coiled spring 14 is firmly secured, the strap passing through the spring, and the opposite or free end of the spring is loosely connected with clip 15, having guided movement on the forward or inner portion of the leading or hitching strap by means of a ring 16, connected with the snap or clip and through which the said strap passes, said snap or clip 15 being connected to the snap or clip 13. It will be understood that in the ordinary hitching or leading strap this spring may be employed, and the snap 15 be connected with a bit-ring or directly with the bridle.

The rope is slack between the free end of the spring 14 and the intermediate loop 11, forming a running-noose loop C. It is evident that after such a halter has been placed in position on the head of a horse and the animal should draw severely on the hitching or leading strap B, the main or noose loop C will be shortened, and consequently would press or grip the nose of the horse more or less severely; and that, as stated, the leading, hitching, or halter strap cannot be broken by a severe and sudden jerk or strain on the part of the horse, since the spring would first receive said strain, and would in a measure dissipate the same before it could reach the strap proper.

Having thus described our invention, we claim as new and desire to secure by Letters Patent—

1. A halter, comprising a rope or strap having a neck-loop at one end, and provided at a predetermined distance from the neck-loop, with a spring, one end only of which is secured to the rope or strap, the other end of the said spring being connected with the neck-loop, whereby a slack portion or noose-loop will be formed adjacent to the neck-loop, substantially as described.

2. A halter, comprising a rope or strap having attaching means at one end, means on the rope or strap to which said attaching means may be fastened, thereby forming a neck-loop, an elastic piece, one end only of which is attached to the rope or strap, the other end having an attaching device, whereby a slack portion may be formed in the rope or strap, said rope or strap extending beyond the spring portion a sufficient distance to be used as a hitching-strap, substantially as described.

3. A hitching device comprising a rope or strap provided at one end with a snap-hook, a loop or eye secured to said rope between its ends, a coiled spring encircling said rope, one end thereof being secured to said rope or strap and the opposite end looped to slide thereon and a hook in said spring-loop for engaging a ring on the end of the strap or rope, substantially as described.

4. A hitching device comprising a rope or strap provided at one end with a snap-hook, and with a loop or eye between its ends with which the snap-hook engages, a coiled spring encircling said rope, said spring having one end secured to the rope or strap and its opposite end looped to slide thereon, and a snap-hook secured to the free end of the spring and engaging the snap-hook on the end of the rope or strap substantially as described.

CHARLES H. ALLEN.
HARRY C. MALTBY.

Witnesses:
BERT F. WILKINSON,
EDWIN K. WALKER.